April 13, 1926.

B. S. SNOW 1,580,695

MATERIAL ELEVATING AND STORAGE APPARATUS

Filed Sept. 25, 1924    8 Sheets-Sheet 6

April 13, 1926.

B. S. SNOW

1,580,695

MATERIAL ELEVATING AND STORAGE APPARATUS

Filed Sept. 25, 1924　　8 Sheets-Sheet 7

April 13, 1926.                                                              1,580,695
                                  B. S. SNOW
                    MATERIAL ELEVATING AND STORAGE APPARATUS
                         Filed Sept. 25, 1924        8 Sheets-Sheet 8

Inventor.
Barton S. Snow

Patented Apr. 13, 1926.

1,580,695

UNITED STATES PATENT OFFICE.

BARTON S. SNOW, OF BATAVIA, ILLINOIS, ASSIGNOR TO T. W. SNOW CONSTRUCTION COMPANY, OF CHICAGO, ILLINOIS, A CORPORATION OF ILLINOIS.

MATERIAL ELEVATING AND STORAGE APPARATUS.

Application filed September 25, 1924. Serial No. 739,801.

*To all whom it may concern:*

Be it known that BARTON S. SNOW, a citizen of the United States, residing at Batavia, in the county of Kane and State of Illinois, has invented a new and useful Improvement in Material Elevating and Storage Apparatus, of which the following is a specification.

My invention relates to apparatus provided along the side of railway tracks for the elevating of different kinds of materials into separate receptacles respectively extending above the tracks, for discharge therefrom, under the control of the operator, as desired. By way of illustration, the apparatus may be provided for receiving coal, sand and water for separate discharge into the tenders of locomotives and cinders dumped from locomotives for delivery into cars.

One of my objects is to provide an economical construction of apparatus involving a single hoisting mechanism and adapted for the reception and storage, in separate receptacles, of different kinds of material.

Another object is to provide apparatus for the purpose just stated, which may be located between the main track and the sidetrack where these tracks are located closely adjacent to each other, as is the usual, and oftentimes, necessary, practice, due to limitation of space; and other objects, as will be manifest from the following:

Referring to the accompanying drawings.

As a preface to the following description, it may be stated that the arrangement shown provided for the storage and delivery of coal, cinders, sand and water, is by way of example only; and that the number of receptacles, and the uses to which they are put, may be varied as desired, within my invention.

The apparatus shown involves a centrally located element represented generally at 20 which includes a storage receptacle for coal, and elevating mechanism for elevating coal into this receptacle or other materials into other receptacles, hereinafter referred to, as desired; and two receptacle-forming elements 21 and 22 located at opposite sides of the element 20, and into which the material may be directed from the elevating mechanism of the element 20.

The group of elements 20, 21 and 22, are located between, and extend in a series lengthwise of, a pair of spaced-apart tracks represented at 23 and 24, respectively, the track 23 representing a main-line track, and the track 24 a sidetrack upon which latter the cars conveying material to be elevated into the elements 20 and 22, and the cars into which the cinders in the upper part of the element 21 are to be dumped, are movable.

In the particular arrangement shown the elements 20, 21 and 22 are formed of shell-like superstructures, preferably of metal, and of cylindrical form, and a sub-structure of concrete shown as common to all three of the elements 20, 21 and 22, and affording a compartment represented at 26.

Referring now to the element represented at 20, the upright shell structure thereof is represented at 27 and is shown as mounted on the sub-structure 25 with its lower open end registering with an opening 28 provided in the top of the sub-structure, the shell 27 being held in place on the sub-structure by a flange-ring 29 bolted, at its flange 30, to the wall of the sub-structure 25 and, at its flange 31, to the lower edge portion of the shell 27.

Figure 4:
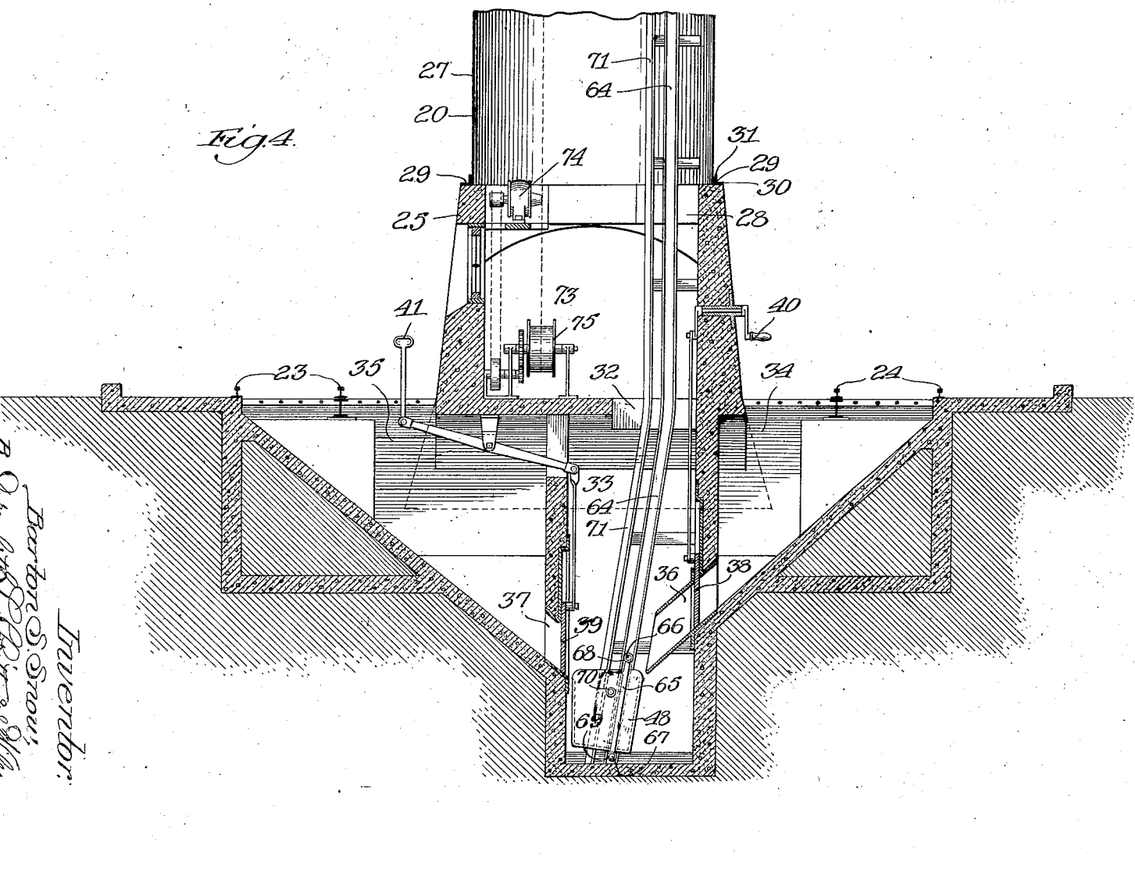
Figure 4 is an enlarged broken view, in vertical sectional elevation, of the middle receptacle, or storage compartment-forming element of the apparatus, the section being taken at the line 4—4 on Fig. 3 and viewed in the direction of the arrows.

The compartment 26 in which the power mechanism, hereinafter referred to, for actuating the elevating element, is located, is preferably in substantially vertical alinement with the shell 27, and contains an opening 32 in its floor in vertical alinement with the shell 27 and communicating with a bucket-pit 33 which extends to a point below pits 34 and 35, the latter being a cinder-pit, located beneath the tracks 23 and 24 and provided for receiving the material to be elevated, into the storage receptacles, the pits 34 and 35 being provided with outlets 36 and 37 so arranged as to discharge material from the pits into the elevating receptacle of the material-elevating mechanism when this receptacle is in its lowermost position represented in Fig. 4, the outlets 36 and 37 being equipped with gate-valves 38 and 39, respectively, separately operable through the medium of the actuating crank 40 and the pull-rod 41, respectively.

The space between the shell 27, intermediate its upper and lower ends, is divided by a partition, represented at 42 and shown as of U-shape in cross-section and presenting the walls 43, 44 and 45, into two compartments 46 and 47, the compartment 47 being open at its upper and lower ends and alining with the bucket-pit 33, and forming a portion of the bucket-way in which the hoisting bucket, hereinbefore referred to, and represented at 48, travels.

The compartment 46 which forms a receptacle for receiving coal delivered to the apparatus by cars running on the tracks 23, and holding it in storage, subject to withdrawal therefrom, as for example, to fill a tender on this track, is provided with a hopper-structure 49 formed with three outlets 50, 51 and 52, the outlet 50 opening downwardly into the storage-receptacle 46, and the outlets 51 and 52, located at opposite sides of the outlet 50, opening laterally into tubular chutes 53 and 54, respectively, which extend through the wall of the shell 27 and communicate at their lower ends with the storage-receptacle in the shell-like superstructure of element 22 and the upper storage-receptacle in the superstructure of element 21, means, hereinafter described, being provided for controlling the discharge from the hopper 49 into any one of these storage receptacles, as desired.

The bottom of the storage receptacle 46, and which inclines downwardly toward the side of the shell 27, adjacent the track 23, is represented at 55 and is shown as supported on a frame-work formed of inclined girders 56 and a suitably supported angle-member 57, the side of the shell 27, adjacent the lower end of the floor 55, containing an outlet 58 communicating with a chute 59 provided with a gate-valve 60, this chute being shown as equipped with a pivotally supported movable chute section 51 for directing the material discharging from the storage receptacle 46 to the desired point of discharge, as for example, to a tender, represented at 62, on the track 23.

Figures 5, 6, 7:
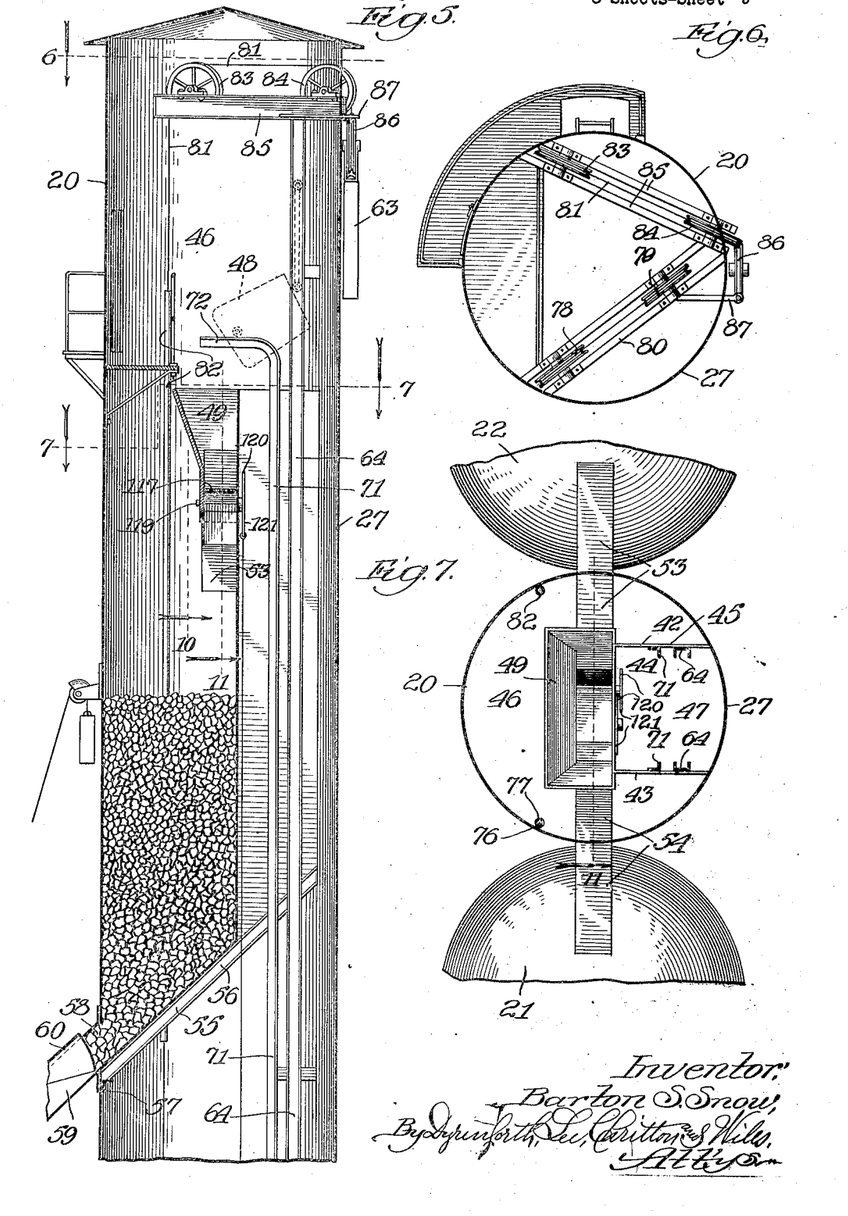
Figure 5 is a similar view of the upper end portion of the receptacle-forming element shown in Fig. 4, the section being taken at the line 5 on Fig. 1 and viewed in the direction of the arrow.
Figure 6 is a plan sectional view taken at the line 6 on Fig. 5 and viewed in the direction of the arrow, with the other receptacle-forming elements omitted.
Figure 7 is a similar view taken at the irregular line 7—7 on Fig. 5 and viewed in the direction of the arrows.
Figure 8:
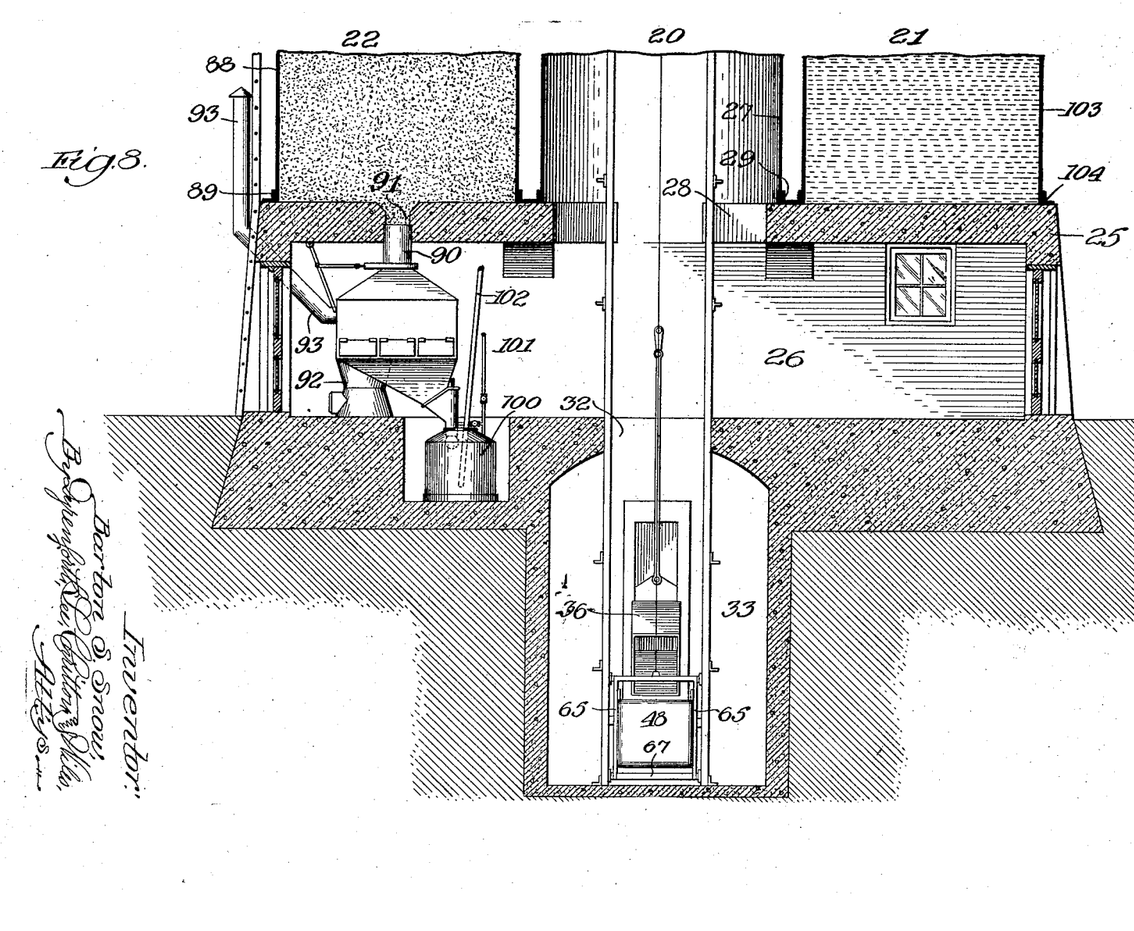
Figure 8 is a view in vertical sectional elevation of the lower end portion of the apparatus, the section being taken at the line 8—8 on Fig. 3 and viewed in the direction of the arrows.

The apparatus also comprises material-elevating mechanism hereinbefore referred to, and of which the elevating bucket 48 is an element. This mechanism may be of any suitable construction, that shown comprising a single elevating bucket counterweighted by the counterweight 63. The bucket 48 is guided in its up and down movements by vertical guide-ways 64 which extend upwardly through the bucket-pit 33, the sub-structure 25, and the shell 27, (these guides being located in the compartment 47), to a point closely adjacent the top of the shell superstructure 27. The guides 64 are secured in position in any suitable way, as for example, at the portions thereof passing through the compartment 47, to the side walls 42 and 43 thereof, as shown. The bucket 48 of the construction shown is carried by a frame-work formed of side-bars, one of which is represented at 65, and upper and lower cross-bars 66 and 67, the bucket being located within the space defined by these elements and pivotally supported on the cross-bar 67 to permit the bucket to rock from the position shown in Fig. 4 to the dotted position shown in Fig. 5, the bucket being so positioned as to cause it to tend to swing, unless restrained, to the position shown in Fig. 5, when filled. The frame-work referred to is provided with upper and lower rollers 68 and 69, respectively, which extend into and are guided by the guides 64 which are shown as slightly deflected at the portions thereof located in the bucket-pit 33 to ensure the proper positioning of the bucket, in its lowermost position, for receiving the material from either of the pits 34 and 35. The bucket 48 is caused to travel throughout the greater portion of its path in the upright position shown in Fig. 4, by engagement of rollers 70 thereon, with guide-rails 71 arranged parallel with the guides 64 and having the out-turned upper end portions 72 which serve to permit the bucket, when it nears the upper end of its travel, to turn to the dumping position shown in Fig. 5, in which position it discharges the material elevated thereby into the hopper 49, the bucket being automatically righted in the lowering thereof from the position shown in Fig. 5.

The mechanism for raising and lowering the bucket 48 comprises any suitable hoisting mechanism represented generally at 73, and which is shown as driven by belted connection with a motor represented at 74, the mechanism just refered to, being located, in the particular arrangement shown, within the compartment 26 in the sub-structure 25, to one side of the path traversed by the bucket 48. The hoisting mechanism 73 comprises a drum 75, as is common in hoisting mechanism for operating buckets, upon which the hoisting cable, between its ends, is wound as is customary in practice, one end of the cable, and which is represented at 76, passing upwardly from the drum through a tube 77 located within the storage receptacle 46, thence passing over a pair of pulleys 78 and 79 journaled on a cross-girder 80 mounted in the upper end of the shell 27 and thence downwardly to the frame on which the bucket 48 is pivoted, to the upper end of which frame the cable is connected substantially midway between the sides of the frame. The other end of the cable, represented at 81, extends upwardly through a sleeve 82 in the storage receptacle 46 and thence passes over pulleys 83 and 84 mounted on a girder 85 in the upper part of the shell 27, the cable end 81 thence passing downwardly beneath a pulley 86 journaled on the upper end of the counterweight 63, the extremity of this free end of the cable being connected with a bracket arm 87 carried by, and rigid with, the cross-girder 80.

The storage-receptacle element 22 provided for receiving and storing sand, for delivery, as desired, comprises, as its super-structure, a shell 88, as for example, of sheet metal, this shell surmounting the sub-structure 25 and secured thereto, through the medium of a flange-ring 89, as explained of the shell 27, the space provided in the interior of this shell forming a storage-receptacle for sand which is delivered thereto through the pipe spout 54.

As the sand as usually provided, requires drying, and removal of the gravel therefrom, the apparatus is shown as provided with means for accomplishing this result, these means being shown as communicating, at their inlet portion 90, with the interior of the storage receptacle in the shell 88, through an opening 91 in the roof of the sub-structure 25. Any suitable drying and separating apparatus may be employed, that shown being of the construction forming the subject of my pending application for U. S. patent, Serial No. 552,683, filed April 14, 1922, the sand to be dried and separated entering the apparatus through the inlet 90 wherein it is subjected to heat from a furnace 92, the outlet stack of which is represented at 93, the sand discharging into sand-elevating apparatus for discharging the sand into a receiver 94 secured to, and located between, the storage receptacle structures 20 and 22 at the side of the apparatus adjacent the track 23, the receiver being provided with a spout section 95, controlled by a valve 96, and opening into a swinging spout section 97 through which the sand, when the valve 96 is opened, may be conducted into the sand box of the locomotive, the spout 97 being shown as counterweighted through the medium of a cable 97$^a$, which is connected at one end to the spout 97 and extends over a pulley 98, and a counterweight 99 secured to the other end of the cable 97$^a$.

The particular, illustrated mechanism of apparatus for elevating the sand from the storage-receptacle in the element 22 is of the same general construction as that disclosed in U. S. Letters Patent No. 1,487,485 granted to me March 18, 1924, and involving, generally stated, a tank 100 into which the sand discharges from the drying apparatus, a pipe 101 leading from any suitable source of compressed air supply and opening into the tank 100 through the top thereof, and a pipe 102 which extends downwardly through the top of the tank 100 into the interior of the latter to a point closely adjacent the bottom thereof and through which the sand in the tank 100 is forced upwardly by the action of the air pressure supplied through the pipe 101, the upper end of the pipe 102 opening into the receptacle 94 adjacent the upper end of the latter.

Figure 1:
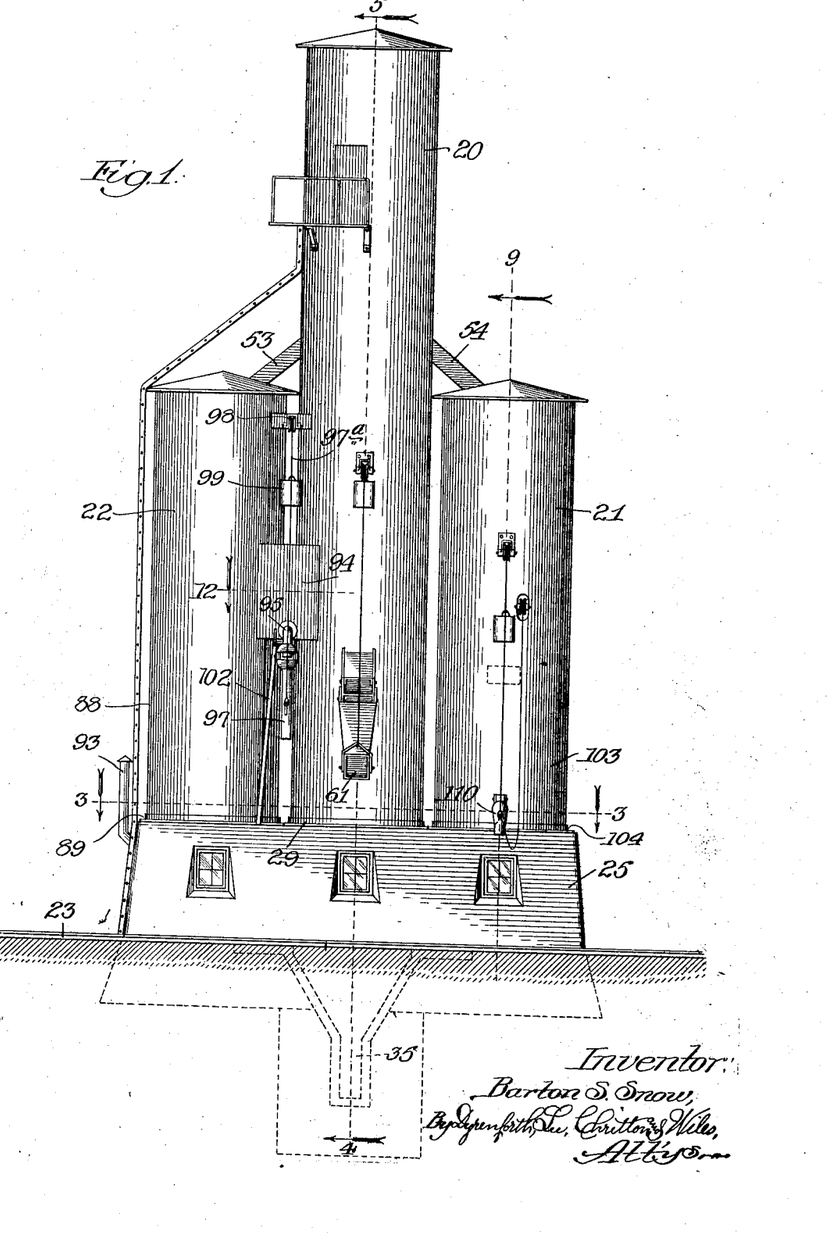
Figure 1 is a view in side elevation of apparatus, provided for receiving and discharging, under control, four different kinds of material, each material being maintained in a separate receptacle.
Figure 2:
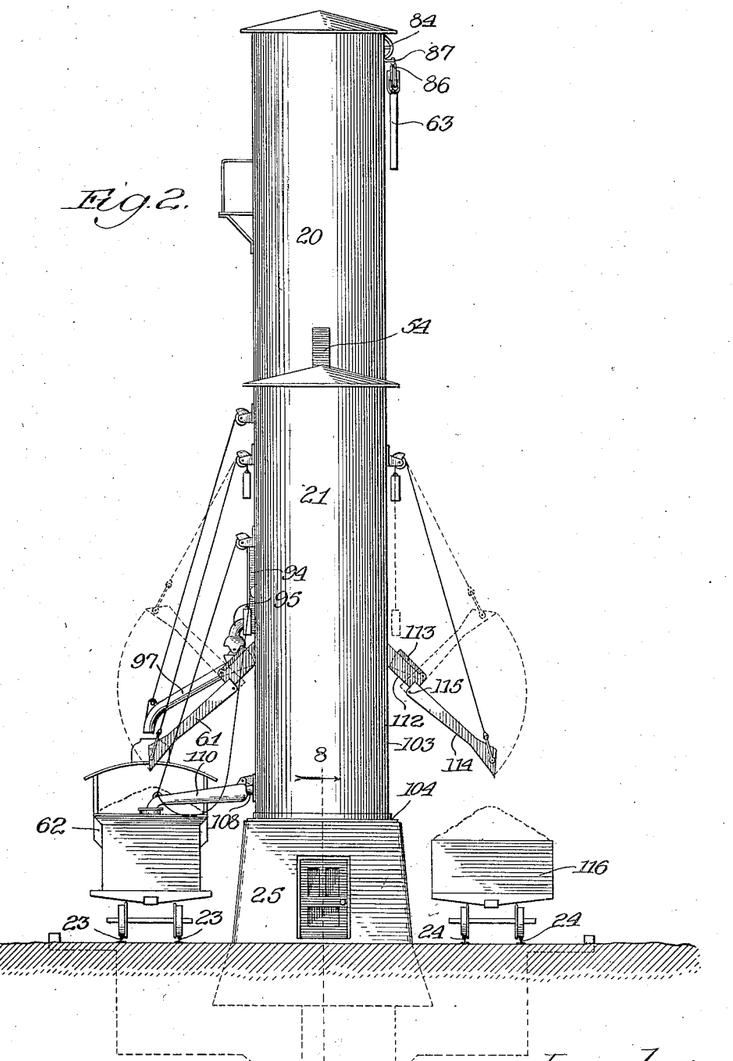
Figure 2 is an end view of the apparatus of Fig. 1.
Figure 3:
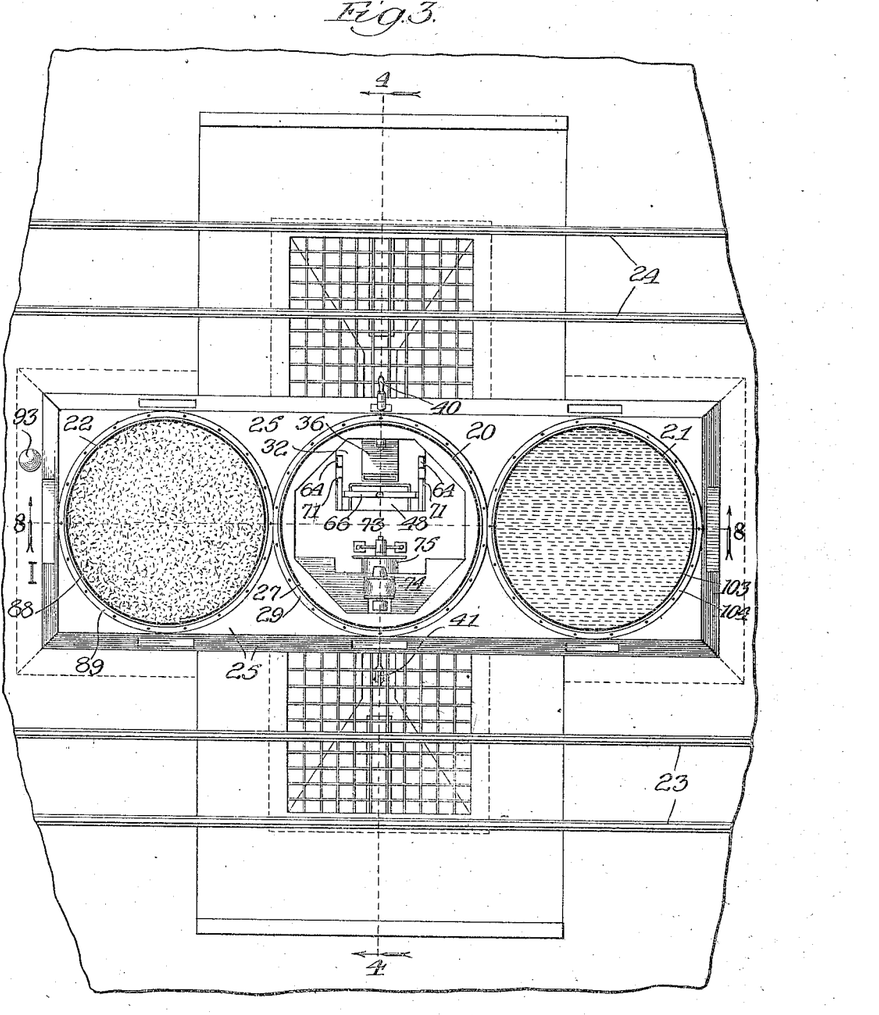
Figure 3 is a plan sectional view of the apparatus of the preceding figures.

The storage-receptacle element 21, as shown, is also formed of a shell 103, shown as cylindrical, and preferably constructed of sheet metal, this shell surmounting the sub-structure 25 and being secured thereto, through the medium of a flange-ring 104 as explained of the structure 20. As designed, the structure 21 is formed with an upper receptacle 105 for cinders and a lower receptacle, or tank, 106 for water, and to this end the shell 103 is provided with an inclined partition 107 which forms a sloping bottom for the receptacle 105 which is preferably lined throughout its extent with any suitable refractory material, as for example, cement, as shown. The water-receptacle 106 is formed at its lower end at the side of the shell 103 adjacent the track 23, with an outlet spout 108 valved, as represented at 109, to control the flow of water therefrom, the spout 108 co-operating with a pivoted spout 110 counterweighted, as shown, and so arranged as to direct the water discharging from the tank 106, into the water tank of the tender 62. The sloping bottom of the receptacle 105 inclines downwardly toward the side of the element 21 adjacent the track 24, the wall of the receptacle 105, at the lower end of the bottom 107, containing an opening 111 forming an outlet communicating with a chute section 112 provided with a gate-valve 113, the chute section 112 co-operating with a swinging chute section 114 pivoted thereto, as represented at 115, and arranged to direct the cinders from the storage receptacle 105, supplied thereto through the spout-section 53, into a car, as for example, the one shown at 116, on the track 24, this chute section being counterweighted as represented in Fig. 2.

Figures 9, 10, 11:
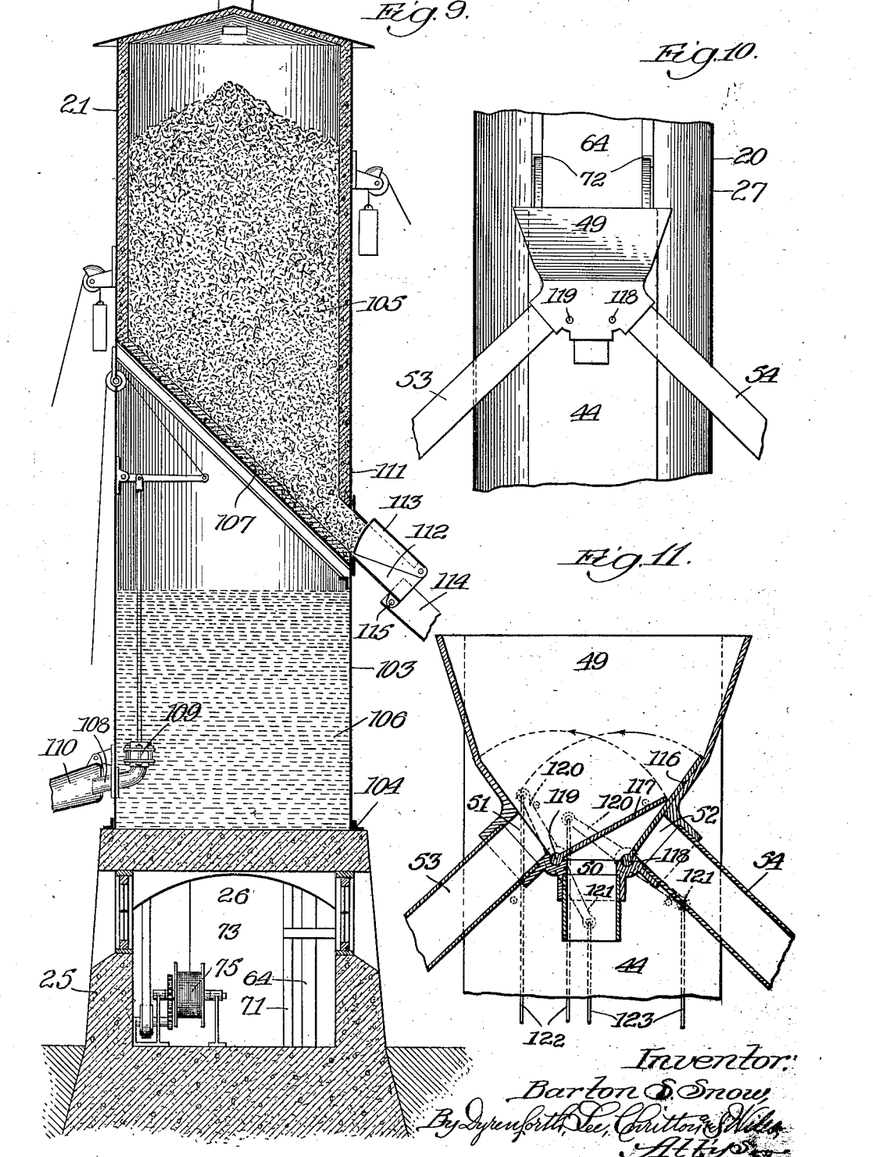
Figure 9 is a view in vertical sectional elevation of another one of the receptacle-forming elements of the apparatus, the section being taken at the line 9 on Fig. 1 and viewed in the direction of the arrows.
Figure 10 is a broken view in sectional elevation of that portion of the middle receptacle-forming element which is provided with means for selectively directing the material elevated by the elevating receptacle, into certain of the storage receptacles, this view being taken at the line 10 on Fig. 5 and viewed in the direction of the arrow.
Figure 11 is a similar view taken at the lines 11 on Figs. 5 and 7, and viewed in the direction of the arrows.
Figures 12, 13:
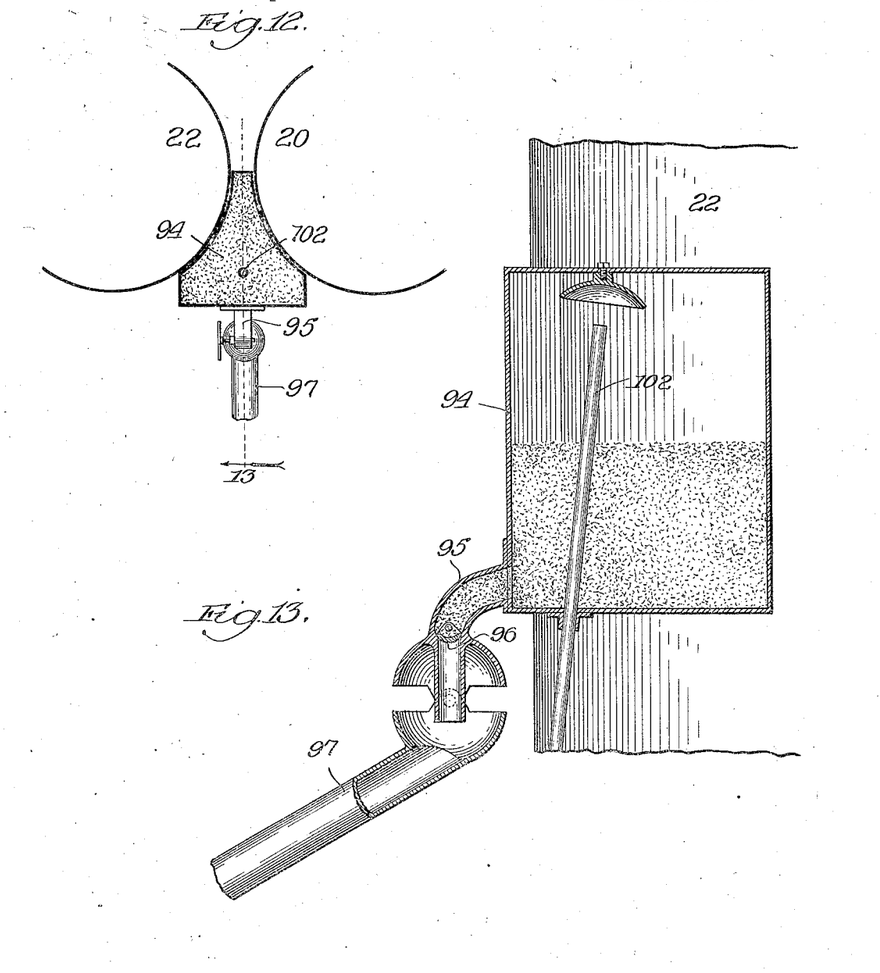
Figure 12 is a broken plan sectional view, taken at the line 12 on Fig. 1 and viewed in the direction of the arrow, illustrating the receiver into which the sand, discharged into the remaining one of the receptacle-forming elements, and thereafter dried, is introduced for delivery, under the control of the operator, into the sand-box of the locomotive.
Figure 13, a section taken at the line 13 on Fig. 13 and viewed in the direction of the arrow.

The hopper structure 49 is provided with means whereby the hopper may be selectively opened to any one of its three outlets 50, 51 and 52, for directing the material discharged into the hopper 49 from the elevating bucket 48, into the proper storage receptacle. The means shown for this purpose comprise two gate-valves 116 and 117, pivotally supported at pivots 118 and 119, respectively, in bearing-portions provided in the bottom portion of the hopper 49, these valves being shown as located at opposite sides of the hopper outlet 50 and of such length that the uppermost one, when swung to open either the outlets 51 or 52 to the interior of the hopper, will extend across the outlet 50 for closing the latter to the hopper. Thus, when these valves are in the position shown in Fig. 11 the outlet 52 is closed by the valve 115 and the outlet 50 is closed by the valve 117, the outlet 51 being open. When both valves 116 and 117 are swung to the left in Fig. 11 as shown by the dotted arcs, the valve 117 will close the outlet 51 and the valve 116 will close the outlet 50, the outlet 52 being open to the hopper in this position of the valves. When it is desired to open the outlet 50 to the hopper the valve 116 is swung to the position shown in Fig. 11 and the valve 117 is swung to the left to close the outlet 51. The valves 116 and 117 are provided with means whereby they may be moved by the operator into and out of the positions described, these means, in the particular construction shown, comprising, as to each of the plates, oppositely radially-extending arms 120 and 121 located exteriorly of the shell 27 and to which cables 122 and 123, extending to a point accessible to the operator, are secured.

By constructing the apparatus in accordance with my invention it may be manufactured relatively economically and particularly when the storage-receptacles are of relatively small capacity, the apparatus being of such compact form that it may be installed in the relatively narrow space commonly provided between the main and side tracks of railroads as commonly provided.

While I have illustrated and described a particular embodiment of my invention, I do not wish to be understood as intending to limit it thereto, as the same may be variously modified and altered without departing from the spirit of my invention.

What I claim as new, and desire to secure by Letters Patent, is:

1. In combination with tracks spaced apart, pits below said tracks, respectively, a storage receptacle for material located between said tracks, and material-elevating mechanism located between said tracks and involving an elevating receptacle, said elevating receptacle in lowered position being so positioned as to receive the material discharging from either of said pits.

2. In combination with tracks spaced apart, pits below said tracks, respectively, storage receptacles for material, material-elevating mechanism located between said tracks and involving an elevating receptacle, said elevating receptacle in lowered position being so positioned as to receive material discharging from either of said pits, and means whereby the material elevated by said elevating receptacle may be selectively directed into said storage receptacles.

3. In combination with tracks spaced apart, pits below said tracks, respectively, a storage receptacle for material located between said tracks, material-elevating mechanism located between said tracks and involving an elevating receptacle, said elevating receptacle in lowered position being so positioned as to receive the material discharging from either of said pits, and means separately controlling the discharge of material from said pits.

4. In combination with tracks spaced apart, pits below said tracks, respectively, storage receptacles for material, material-elevating mechanism located between said tracks and involving an elevating receptacle, said elevating receptacle in lowered position being so positioned as to receive material discharging from either of said pits, means whereby the material elevated by said elevating receptacle may be selectively directed into said storage receptacles, and means for separately controlling the discharge of material from said pits.

5. In combination with tracks spaced apart, a housing structure located between said tracks and presenting a storage receptacle and an upwardly extending passageway extending alongside of said receptacle, material-elevating mechanism in said housing structure and involving an elevating receptacle movable in said passage-way, power means in said housing structure for operating said elevating receptacle, a second storage receptacle located between said tracks, said receptacles being disposed in a series extending lengthwise of the tracks, and means whereby the material elevated by said elevating receptacle may be selectively directed into said storage receptacles.

6. In combination with tracks spaced apart, a housing structure located between said tracks and presenting a storage receptacle and an upwardly extending passageway extending alongside of said receptacle, material-elevating mechanism in said housing structure and involving an elevating receptacle movable in said passage-way, power means in said housing structure for operating said elevating receptacle and located below said storage receptacle, a second storage receptacle located between said tracks, and means whereby the material elevated by said elevating receptacle may be selectively directed into said storage receptacles.

7. In combination with tracks spaced apart, pits below said tracks, respectively, a housing structure located between said tracks and presenting a storage receptacle and an upwardly extending passage-way extending alongside of said receptacle, material-elevating mechanism in said housing structure and involving an elevating receptacle movable in said passage-way, power means for operating said elevating receptacle located below said storage receptacle, a second storage receptacle located between said tracks, said elevating receptacle in lowered position being so positioned as to receive material discharging from either of said pits, and means whereby the material elevated by said elevating receptacle may be selectively directed into said storage receptacle.

8. In apparatus of the character set forth, the combination of a sub-structure presenting a compartment, a plurality of shell-like super-structures surmounting said sub-structure, each of said super-structures presenting a storage receptacle, and one of said super-structures containing a passage-way extending alongside of the receptacle therein, and opening into the compartment in said sub-structure, material-elevating mechanism involving an elevating element operating in said passage-way, and power-mechanism for actuating said elevating element located in said compartment in the sub-structure, and means for selectively directing material elevated by said elevating receptacle into said storage receptacles.

BARTON S. SNOW.